United States Patent [19]
Vogt, Jr. et al.

[11] 3,896,877
[45] July 29, 1975

[54] METHOD OF SCHEDULING PROPPING MATERIAL IN HYDRAULIC FRACTURING TREATMENT

[75] Inventors: Thomas C. Vogt, Jr., Duncanville; John L. Fitch, Dallas, both of Tex.

[73] Assignee: Mobil Oil Corporation, New York City, N.Y.

[22] Filed: Jan. 28, 1974

[21] Appl. No.: 437,106

[52] U.S. Cl. .................................. 166/250; 166/280
[51] Int. Cl.² .......................................... E21B 43/26
[58] Field of Search ............ 166/250, 280, 271, 308

[56] References Cited
UNITED STATES PATENTS

| | | | |
|---|---|---|---|
| 3,155,159 | 11/1964 | McGuire, Jr. | 166/280 |
| 3,164,208 | 1/1965 | McGuire, Jr. | 166/280 |
| 3,235,007 | 2/1966 | Kern et al. | 166/280 |
| 3,709,300 | 1/1973 | Pye | 166/280 |

OTHER PUBLICATIONS
Babcock et al., "Distribution of Propping Agents in Vertical Fractures," Producers Monthly, Vol. 31, No. 11, Nov. 1967, pp. 11–17.

Primary Examiner—Stephen J. Novosad
Assistant Examiner—George Suckfield
Attorney, Agent, or Firm—C. A. Huggett; Henry L. Ehrlich

[57] ABSTRACT

This specification discloses a hydraulic fracturing process of forming and propping a vertical fracture in a subterranean formation. Propping material is scheduled into the fracturing fluid in an amount sufficient to fill the fracture to a predetermined height concomitantly with the forming of the fracture. The schedule provides for a high concentration of propping material in the fracturing fluid early in the fracturing treatment and decreasing concentrations as the fracture is extended into the formation.

6 Claims, 3 Drawing Figures

METHOD OF SCHEDULING PROPPING MATERIAL IN HYDRAULIC FRACTURING TREATMENT

BACKGROUND OF THE INVENTION

This invention is directed to a method of fracturing a subterranean earth formation from a well penetrating the formation. More specifically, this invention is directed to scheduling the propping material which is entrained in the fracturing fluid that is used in forming a vertical fracture in the subterranean formation.

Techniques for hydraulically fracturing subterranean formations by injecting a fracturing fluid down a well and into the formation under sufficient pressure to create fractures in the formation are well known. Both horizontal and vertical fractures have been created in subterranean formations by hydraulic fracturing techniques. However, when the subterranean formation to be fractured is at a depth greater than about 3000 feet, vertical fractures are generally formed in the formation.

In order to maintain the vertical fractures open after they are formed, propping material is often entrained in the fracturing fluid that is used to form the fractures. A common propping material is sand of 20–40 mesh size. However, other types of propping material are sometimes used such as, for example, glass beads and nut shells. The term "sand" may be used generically, however, to include any propping material which is used to prop the fracture open.

Problems have persisted in propping vertical fractures to provide high fluid conductivity within the fractures. If too great a concentration of propping material is used in the fluid injected into the fractures a "screen out" or "sand out" occurs, that is, there is a blockage of the flow path of the fluid being injected into the formation by accumulation of the propping material in some region of the flow path. If too low a concentration is used, too little of the fracture is propped to provide high fluid conductivity or an excessive amount of fluid is required to be injected to provide sufficient propping material to prop the fracture.

In conventional hydraulic fracturing techniques a propping concentration is normally preselected for use in the fracturing fluid. In HYDRAULIC FRACTURING, G. C. Howard and C. R. Fast, Society of Petroleum Engineers of AIME, New York, Dallas, 1970, at page 128, it is said that hydraulic fracturing treatments require that a specific and uniform concentration of the sand, or other propping agent, be injected into a particular fracture zone. Excessive sand concentrations may cause sand to bridge in the well or in the fracture, preventing further injection of proppant. An inadequate concentration of the propping agent allows the fracture to close after treatment.

A propping agent concentration of 1 pound per gallon is commonly used, though propping agents have been added in concentrations varying from 0.1 to 8.0 pounds per gallon. In carrying out hydraulic fracturing treatments, it is common practice to first inject a fluid pad into the formation to initiate the fracture and thereafter to inject a very low concentration of propping agent along with the fracturing fluid to ensure that the fracture is taking the propping agent. The propping agent concentration is then increased stepwise until the selected concentration is reached. Many times the steps are selected such that the selected concentration is not obtained until very near the end of the fracturing treatment in order to avoid the possibility of a "sand out."

It is pointed out in an article entitled "Distribution of Propping Agents in Vertical Fractures," R. E. Babcock, C. L. Prokop, and R. O. Kehle, DRILLING AND PRODUCTION PRACTICE 1967, American Petroleum Institute, that the optimum propping agent distribution is one that offers the greatest fracture permeability while possessing sufficient strength to prevent "healing" through particle crushing or embedment into the formation. This may be accomplished by employing two types of distribution considered to occur in conventional treatments; partial monolayers and packed multilayers. In a partial monolayer, the fracture is propped by more or less evenly spaced, single particles distributed throughout the entire fracture area. It is pointed out, however, that careful consideration must be given to the fluid viscosity, particle size and density, and pump rate to achieve a partial monolayer distribution, and that it is commonly not feasible to perform a fracturing treatment in such a way that a partial monolayer distribution results and a packed multilayer is formed instead. A packed multilayer distribution is one in which several layers of particles form between the surfaces of the fracture during the injection period.

The teachings of U.S. Pat. No. 3,266,573 are directed to increasing the permeability of fractures in subterranean formations by placing the propping material in the fracture in the form of a monolayer. There is deposited in the fracture a partial monolayer of relatively large particles of a propping material and relatively small particles of a spacer material with the spacer material being subsequently flushed from the fracture to provide high capacity flow channels between the particles of propping material retained in the fracture. The volume ratio of the spacer material to the propping material is such as to achieve a partial monolayer of propping material providing the desired flow capacity in the fracture.

In U.S. Pat. NO. 3,155,159 there is described a method of depositing a multi-layer pack of sand in a fracture in a formation. Small-sized material is deposited in the bottom of the fracture by suspending the material in a fluid in which the settling rate of the material is in excess of 0.1 foot per minute. After a sufficient volume of the small-sized material is deposited in the bottom of the fracture, the permeable section of the fracture above this deposit of small-sized material is propped with a large-sized propping agent by suspending this second agent in a carrier fluid which will completely suspend the particles or, in actual practice, have a falling rate of less than 0.1 foot per minute. This suspension of large particle-form material will result in a single layer, or less than a single layer, of such agent being deposited in the top of the fracture.

SUMMARY OF THE INVENTION

This invention is directed to a method of forming vertical fractures in a subterranean formation that is penetrated by a well wherein a fracturing fluid containing propping material is injected into the formation. A determination is made of the initial proppable fracture volume that is generated in the formation per initial incremental volume of fracturing fluid injected and a determination is made of the initial amount of propping material that is required to fill the initial proppable fracture volume to a predetermined height. The determined amount of propping material is injected into the initial incremental volume of fracturing fluid that is injected into the fracture and these steps are repeated for subsequent incremental volumes of fracturing fluid injected into the formation.

DESCRIPTION OF THE PREFERRED EMBODIMENTS

This invention is directed to a method of hydraulically fracturing a subterranean formation and, more particularly, to scheduling the propping material carried by a hydraulic fracturing fluid that is used in fracturing the formation.

This invention provides for a hydraulic fracturing treatment to pack a fracture as it is generated in a formation with a minimum amount of fracturing fluid. A determination is made of the initial proppable fracture volume that is generated in the formation per initial incremental volume of fracturing fluid that is injected into the formation. By "proppable fracture volume" is meant that volume of the fracture which has a width equal to at least two proppant grain diameters. Thereafter, a determination is made of the initial amount of propping material which is required to fill this initial proppable fracture volume to a predetermined height. The propping material concentration is then scheduled in the initial incremental volume of fracturing fluid to prop the initial proppable fracture volume to the predetermined height concomitantly with the forming and propagation of the fracture into the formation. These steps are repeated for succeeding incremental volumes of fracturing fluid and the propping material concentration is scheduled to prop to a predetermined height the fracture as it is generated.

As the fracture is propagated into the formation and greater fracture area is created, increasing amounts of fracturing fluid are lost to the formation. To account for this the propping material concentration is decreased as the fracture is propagated into the formation. Thus, in accordance with this invention the propping material concentration is greatest at the early part of the fracturing treatment and decreases to a least concentration near the end of the fracturing treatment.

Figure 1:
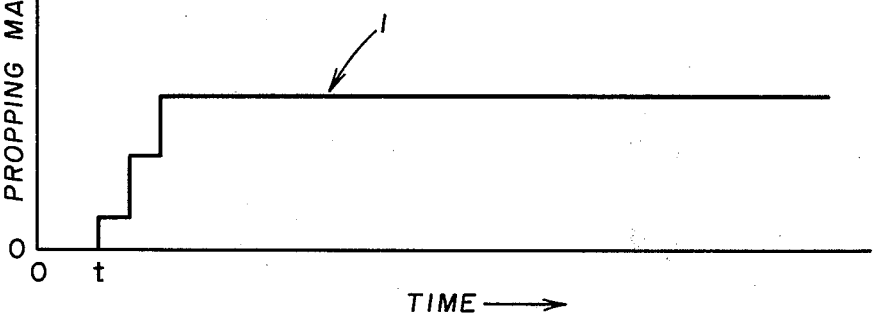
FIG. 1 is a graph of Propping Material Concentration versus Time illustrating a conventional propping material concentration schedule.

For a more detailed description of this invention reference is made to the FIGURES. FIG. 1 is a graph of propping material concentration versus time which is representative of a conventional propping material schedule in a hydraulic fracturing technique. Curve 1 is indicated to begin at a time $t$ which is indicative of a fluid pad having been injected into the formation to be fractured preceding the inclusion of propping material in the fracturing fluid. The purpose of the fluid pad is to create a fracture of sufficient width to permit entry of the proppant into the fracture. The minimum width requirement is usually considered to be twice that of the proppant diameter. Curve 1 rises in stepwise fashion to a uniform concentration and remains at this uniform concentration throughout the fracturing treatment. In other conventional techniques the increase in propping material concentration may be scheduled to reach the uniform concentration near the end of the fracturing technique. The primary concern in conventional techniques is to limit the propping material concentration to avoid a screen out while still including enough propping material to prop the fracture.

Figure 2:
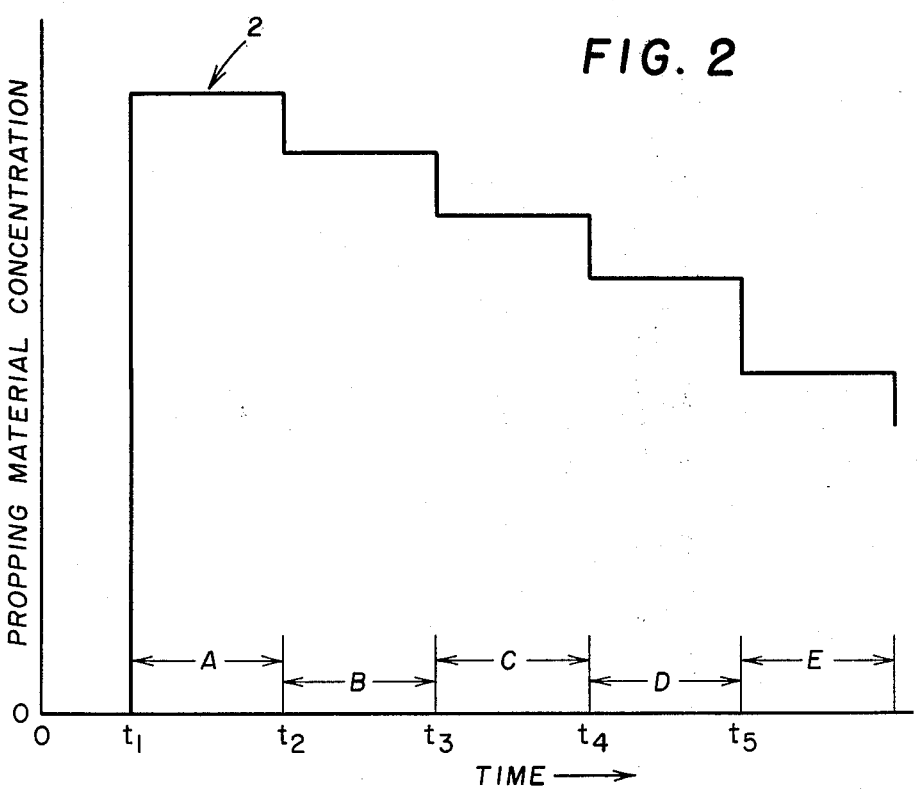
FIG. 2 is a graph of Propping Material Concentration versus Time illustrating the scheduling of propping material concentration in accordance with an embodiment of this invention.

The present invention enables the propping material concentration to be scheduled to provide an optimum amount of propping material to be injected along with the fracturing fluid to prop the fracture to a predetermined height without running the risk of a screen out. Referring to FIG. 2, there is shown a graph of propping material concentration versus time which is typical of the propping material schedule which is used in accordance with this invention. Curve 2 is seen to begin at a time $t_1$, similar to that of curve 1, again indicating that a fluid pad without propping material is injected into the formation preceding the inclusion of propping material in the fracturing fluid to create a fracture wide enough to permit entry of the proppant into the fracture as described above. Curve 2 rises rapidly to a propping material concentration which is determined to be sufficient to fill to a predetermined height an increment of the proppable fracture that is formed during the time period A. Curve 2, in practice, may rise rapidly in a series of steps rather than in one step as shown to facilitate injecting the propping material into the formation. The propping material concentration then decreases at time $t_2$ to a concentration determined to be sufficient to fill to a predetermined height an increment of the proppable fracture that is formed during the time period B. Further reductions in the propping material concentration are shown at times $t_3$, $t_4$, and $t_5$ which correspond with the concentration requird to fill to a predetermined height the later created incremental fracture volumes that are formed during the time periods C, D, and E.

Figure 3:
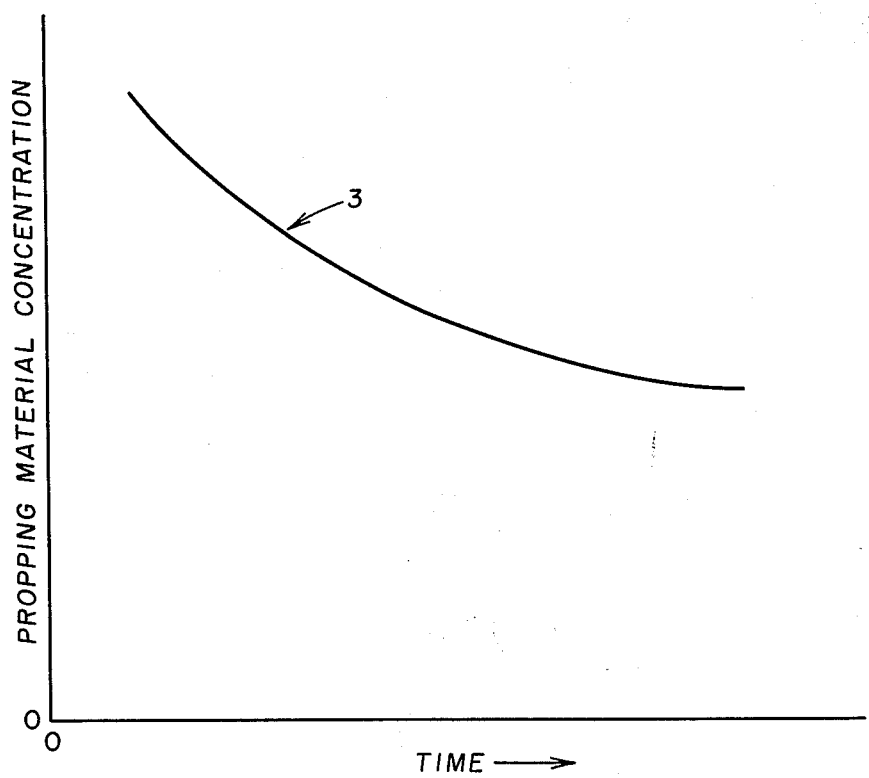
FIG. 3 is a graph of Propping Material Concentration versus Time illustrating another embodiment of this invention.

Referring to FIG. 3 there is shown a continuous curve 3 illustrating an embodiment wherein the propping material concentration is continually decreased with increasing time. A propping material concentration schedule corresponding with curve 3 is obtained by taking very small incremental time intervals and resulting small incremental fracture volumes and determining for each small incremental fracture volume the propping material concentration which will fil to a predetermined height the small increment of the proppable fracture.

In discussing FIGS. 2 and 3, reference has been made to incremental fracture volumes that are generated whereas the abscissas of the graphs are time. However, it is considered that the rate of injection of fracturing fluid into a formation being fractured is constant and that the increment of fracture volumes generated is related to the incremental volume of fracturing fluid injected into the formation as a function of time or cumulative volume injected.

In carrying out this invention, a determination is made of the volume of fracture that is generated per incremental volume of fracturing fluid that is injected into the formation. The concentration of propping material in the fracturing fluid is then scheduled to provide a volume of propping material that is sufficient to fill the proppable fracture volume to a predetermined height. An incremental fracture volume which is considered to be a desirable incremental volume to use in an embodiment of this invention is 1000 gallons. In another embodiment a very small incremental volume is considered which enables the propping material concentration to be scheduled in the fracturing fluid in essentially a continuously varying and decreasing amount. The predetermined height is a height of at least 60 percent of the height of the vertical fracture and preferably is a height of about 75 percent of the height of the vertical fracture. The volume of the fracture generated may be determined by reference to Chapter 4 of HYDRAULIC FRACTURING, G. C. Howard and C. R. Fast, Society of Petroleum Engineers of AIME, New York, Dallas, 1970. There it is shown that the rate at which fracture volume is generated or increased may be calculated by Equation (1) below:

$$\frac{dV_F}{dt} = W \frac{dA_{ff}}{dt} \qquad (1)$$

where
$V_F$ = the volume of fracture generated at time $t$;
$W$ = the average width of the fracture;
$A_{ff}$ = the area of the fracture face at time $t$, this may be determined by Equation (2) below; and
$t$ = time.

$$A_{ff} = \frac{iW}{4\pi C^2} \left[ e^{\left(\frac{2C\sqrt{\pi t}}{W}\right)^2} \; erfc \; \frac{2C\sqrt{\pi t}}{W} + \frac{4C\sqrt{t}}{W} - 1 \right] \qquad (2)$$

where
$i$ = injection rate; and
$C$ = fracturing fluid coefficient. The total fracture volume may be obtained by integrating Equation (1) over the treating time. Methods for calculating the fracture area $A_{ff}$ and the width of the fracture $W$ are described in Chapter 4 of HYDRAULIC FRACTURING, and, specifically, on pages 44 and 42, respectively. The proppable volume may be taken as:

$$V_{prop} = V_F - V_{2d} \qquad (3)$$

where
$V_{prop}$ = proppable fracture volume;
$V_F$ = volume of fracture generated; and
$V_{2d}$ = volume of fracture generated from the beginning of the treatment until the time when the fracture width at the wellbore exceeds two proppant grain diameters. In field terms this is the fluid pad volume which is injected into the formation prior to the injection of propping material into the formation.

A determination is then made of the amount of the propping material which is required to fill the generated fracture volume to a predetermined height. The propping material concentration of the fracturing fluid may then be scheduled to provide the desired amount of propping material to prop the fracture to the predetermined height. This concentration may be expressed as Equation (4) below:

$$P_c = \frac{V_{Prop} \times D_P}{V_{FL}} \left(\frac{H_P}{H_F}\right) \qquad (4)$$

where:
$P_c$ = propping material concentration, weight per unit volume;
$V_{Prop}$ = proppable volume of fracture generated per incremental time;
$D_P$ = density of propping material;
$V_{FL}$ = incremental volume of proppant-carrying fluid pumped into the formation;
$H_P$ = height of fracture propped; and
$H_F$ = total height of the fracture.

We claim:

1. A hydraulic fracturing technique for generating a vertical fracture in a subterranean formation that is penetrated by a well wherein a fracturing fluid containing propping material is injected into said formation, comprising the steps of:
   a. determining the initial proppable fracture volume that is generated per initial incremental volume of fracturing fluid injected into said formation as a function of time;
   b. determining the initial amount of propping material that is required to fill said initial proppable fracture volume to a height of at least 60 percent of the height of said vertical fracture;
   c. iterating steps (a) and (b) for the time required to complete said hydraulic fracturing technique to determine as a function of time the amount of propping material required to fill said vertical fracture to a height of at least 60 percent of the height of said vertical fracture; and
   d. scheduling the propping material concentration of said fracturing fluid in accordance with the determinations of steps (a), (b), and (c).

2. In a method of generating a vertical fracture in a subterranean formation that is penetrated by a well wherein a fracturing fluid containing propping material is injected into said formation, the method of scheduling said propping material into said fracturing fluid, comprising the steps of:
   a. determining the initial proppable fracture volume that is generated in said formation per initial incremental volume of fracturing fluid injected into said formation in accordance with the following relationship $$V_{Prop} = V_F - V_{2d}$$

where
$V_{Prop}$ = the proppable volume of fracture generated per incremental time,
$V_F$ = the volume of fracture generated,
$V_{2d}$ = the volume of fracture generated from the beginning of the treatment until the time when the fracture width at the wellbore exceeds two proppant grain diameters;
   b. determining the initial amount of propping material that is required to fill said initial proppable fracture volume to a height of at least 60 percent of the height of said vertical fracture;
   c. injecting said determined amount of propping material into said initial incremental volume of fracturing fluid injected into said fracture; and d. repeating said steps (a), (b), and (c) for subsequent incremental volumes of fracturing fluid injected.

3. The method of claim 2 wherein in step (c) said propping material concentration is determined in accordance with the following relationship:

$$P_c = \frac{V_{Prop} \times D_P}{V_{FL}} \left(\frac{H_P}{H_F}\right)$$

where:
- $P_c$ = the propping material concentration, weight per unit volume,
- $V_{Prop}$ = the proppable volume of fracture generated per incremental time,
- $D_P$ = density of propping material,
- $V_{FL}$ = the incremental volume of proppant-carrying fluid pumped into the formation,
- $H_P$ = the height of fracture propped, and
- $H_F$ = the total height of the fracture.

4. In a method of generating a vertical fracture in a subterranean formation that is penetrated by a well wherein a fracturing fluid containing propping material is injected into said formation, the improvement comprising:

a. injecting into said formation a first incremental volume of fracturing fluid having a first concentration of propping material to generate a first proppable fracture volume, said first concentration of propping material being sufficient to fill said first proppable fracture volume with propping material to a height of at least 60 percent of the height of said vertical fracture;

b. injecting into said formation a second incremental volume of fracturing fluid having a second concentration of propping material, said second concentration of propping material being less than said first concentration of propping material; and c. injecting into said formation a third incremental volume of fracturing fluid having a third concentration of propping material, said third concentration of propping material being less than said second concentration of propping material.

5. The method of claim 4 further comprising injecting into said formation subsequent incremental volumes of fracturing fluid containing subsequent concentrations of propping material, each subsequent concentration of propping material being less than the next preceding subsequent concentration of propping material.

6. The method of claim 5 wherein said first, second, third, and subsequent incremental volumes of fracturing fluid are about 1000 gallons.

* * * * *